United States Patent Office 3,443,015
Patented May 6, 1969

3,443,015
NEMATOCIDAL METHODS EMPLOYING 2-PERFLUOROALKYLBENZIMIDAZOLES
Quentin F. Soper, Indianapolis, Ind., assignor to Eli Lilly and Company, Indianapolis, Ind., a corporation of Indiana
No Drawing. Filed May 29, 1967, Ser. No. 642,152
Int. Cl. A01n 9/22
U.S. Cl. 424—273                    4 Claims

ABSTRACT OF THE DISCLOSURE 2-perfluoroalkylbenzimidazoles are used as nematocidal agents and soil fumigants.

Background of the invention

Smith and Steinle, J. Am. Chem. Soc., 75, 1292 (1953), first prepared 2-perfluoroalkylbenzimidazoles as growth-stimulants in animals because of their close relationship to dimethylbenzimidazole found in vitamin $B_{12}$. Carver, Foster and Overend, J. Chem. Soc., 1959, 409, and Bishop, Chelton and Jones, Biochem. Pharm., 1964, 751, reported on the anti-microbial activity of various 2-perfluoroalkyl-benzimidazoles, finding a few of these compounds active against certain bacterial species. It has also been widely reported that this same group of compounds has an excellent herbicidal activity, either pre- or post-emergence; see for example Pfeiffer, 2nd Symposium on New Herbicides, p. 12, European Weed Council (1961) Editions Essoir, Paris, France; British Patent 1,015,937; French Patent 1,430,139; and Australian Patent 40,642/64. In addition, French Patent 1,430,139 and South African Patents 65/5584 and 64/4256 state that certain benzimidazoles are useful as insecticides and even suggest that they have nematocidal activity, though no test data are revealed. The structural requirements for insecticidal activity, however, are quite different from those for herbicidal activity in that the 1-position of the imidazole moiety must be substituted for effective insecticidal action, whereas the presence of such a substituent effectively removes all herbicidal action. Many of these same compounds have also been found to be excellent fungicides, as set forth in South African Patent 46/480.

In addition to the above specific applications of known 2-perfluoroalkylbenzimidazoles, it has been found that other types of benzimidazoles with different substituents in the 2-position are extremely active pesticidal agents; see for example Netherlands Patent 6605140 and Belgian Patents 678,095 and 677,941. A large number of such benzimidazoles have been utilized as coccidiostats. The structures of compounds having these activities, however, are so far removed from that of 2-perfluoroalkylbenzimidazole and its congeners (in that there is usually a heterocyclic nucleus in the 2-position of the benzimidazole ring) that no further reference to these compounds is deemed necessary.

Summary

This invention provides a method of eliminating nematodes from a soil locus infested therewith which comprises applying to said soil locus an effective amount of a 2-perfluoroalkylbenzimidazole of the following formula:

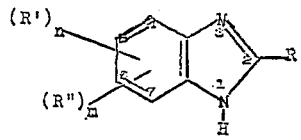

wherein R is a $C_1$–$C_3$ perfluoroalkyl group such as trifluoromethyl, pentafluoroethyl, heptafluoro-n-propyl and heptafluoroisopropyl; R' is nitro or chloro; R" is methyl or trifluoromethyl; n is 0, 1 or 2 and m is 1 or 2. When m or n is 2, R' and R" can be the same or different members of the groups set forth above.

Typical compounds which can be used in the novel process of this invention include 4,7-dimethyl-2-trifluoromethylbenzimidazole
4,7-dinitro-2,5-bis-(trifluoromethyl)benzimidazole
5,6-dinitro-2-trifluoromethylbenzimidazole
5-trifluoromethyl-2-pentafluoroethylbenzimidazole
4-trifluoromethyl-2-pentafluoroethylbenzimidazole
4-trifluoromethyl-6-nitro-2-pentafluoroethyl-
 benzimidazole
4-trifluoromethyl-7-chloro-2-pentafluoroethyl-
 benzimidazole
4-methyl-7-nitro-2-heptafluoroisopropylbenzimidazole
4-nitro-6-trifluoromethyl-2-heptafluoroisopropyl-
 benzimidazole
5-chloro-6-methyl-2-heptafluoro-n-propylbenzimidazole
4,5-bis-(trifluoromethyl)-2-heptafluoro-n-propyl-
 benzimidazole
4-methyl-5-chloro-2-heptafluoro-n-propylbenzimidazole
2,4,6-tris-(trifluoromethyl)benzimidazole
2,5-bis-(trifluoromethyl)benzimidazole
2,4,7-tris-(trifluoromethyl)benzimidazole
2,5,6-tris-(trifluoromethyl)benzimidazole
2,4,5-tris-(trifluoromethyl)benzimidazole The nematocidal activity of compounds having the above structure against the root knot nematode, *Meloidogyne incognita*, was established as follows: 0.625 milligram of the compound under test was formulated by dissolving the compound in 0.5 ml. of a 4:1 ethanol-acetone solvent mixture and bringing the volume up to 5 ml. with a 0.1 percent aqueous polyoxyethylene sorbitan mono-oleate solution to which had been added 3 g. of granular-form diatomaceous earth. The formulated compound was thoroughly mixed with 100 g. of sandy loam. Five milliliters of a nematode larvae suspension inoculum were added to the treated soil, and the inoculum thoroughly dispersed throughout the treated soil sample. The inoculum was prepared as follows: roots of 4 tomato plants heavily infested with the root knot nematode, *Meloidogyne incognita*, were washed thoroughly in tap water, cut into quarter-inch pieces, mixed with 400 ml. of water and blended in a Waring blender for 20 seconds. The resulting suspension was strained through one layer of cheese cloth and was then ready for use. The treated, nematode-inoculated soil was transferred immediately after mixing to 2½ inch plastic pots which were seeded to the green prolific variety of cucumber. The seeded pots were then kept at 78° F. in a greenhouse furnished with a source of supplemental lighting. Twenty-eight days after seeding, the disease ratings of the plants were recorded. A rating of 0 indicated severe disease, a rating of 4, no disease and ratings of 1, 2 or 3 gradations between these two extremes. All disease ratings were read by the same individual (so as to eliminate any variation in disease rating caused by different individuals rating the plants). Similar ratings were made regarding the phytotoxicity of the compound, a rating of 4 indicating complete kill, a rating of 0 indicating no visible effect upon the plant and ratings of 1, 2 or 3 indicating gradations between these two extremes. Table I below gives the results of testing 4-nitro-2,6 - bis - (trifluoromethyl)benzimidazole, a compound coming within the scope of the above formula, according to the above procedure. In the table, column 1 gives the application rate of the compound in pounds per acre, column 2 the disease rating for the particular application rate, and column 3 the phytotoxicity rating for the same application rate.

TABLE I

| Application rate (lb./A) | Disease rating | Phytotoxicity |
|---|---|---|
| 20 | 4 | 0 |
| 10 | 4 | 0 |
| 5 | 4 | 0 |
| 2.5 | 4 | 0 |

The activity of compounds having the above structure against stem nematodes was established as follows: An inoculum of the stem nematode, *Ditylenchus dipsaci* Kuhn, was prepared by rearing the test organism aseptically in alfalfa tissue on an agar medium set in petri dishes. The nematodes were extracted from the medium by suspending the petri dishes face down on a screen in a small zoological pan containing sufficient water to just cover the agar. A heavy population of nematodes was extracted by this method, and the extract was diluted for use.

Two and one-half inch plastic pots were filled with 125 g. each of oven-dried masonry sand, and each pot was planted to 15 seeds on alfalfa var. Du Puits. Ten milliliters of the above diluted nematode suspension were applied directly to the pot and an additional 25 g. of sand added. A stock solution of the test compound was prepared by dissolving the chemical in a 1:1 ethanol-acetone solvent mixture and diluting it to the desired volume with a 0.1 percent of polyoxyethylene sorbitan mono-oleate solution. Twenty-five milliliters of the diluted solution were poured on the surface of the pot. The pots were inspected 7–10 days later, and the degree of disease attributable to stem nematode and the phytotoxicity attributable to the compound were determined by visual observation using the same 4–0 scale described above. Table II which follows gives the results of tests on 4-methyl-2-trifluoromethylbenzimidazole. In the table, column 1 gives the application rate in pounds per acre, column 2 the disease rating for the particular application rate, and column 3 the phytotoxicity rating at the same application rate.

Table II

Application rate (lb./a.) _____ 20
Disease rating _____ 3
Phytotoxicity _____ 3

5,6 - dinitro - 2 - trifluoromethylbenzimidazole is also a particularly effective nematocidal agent.

The compounds of this invention are applied to a nematode-infested soil at rates varying from about 2.5 to about 20 pounds per acre. The compounds are customarily applied to the surface of the soil either in pure form or diluted with an inert solid or liquid diluent. When applied to soil in liquid form, usually by spraying, the nematocidal agents can be formulated as aqueous emulsions. A suitable liquid formulation follows:

4 - nitro - 2,5 - bis - (trifluoromethyl)benzimidazole _____mg__ 60
Ethanol _____ml__ 1.25
Water _____ml__ 12.5
Dispersant _____ml__ .0125

Useful dispersants for the above formulation include a mixture of the calcium salt of benzene dodecylsulfonate and either a polyoxyethylene ether of nonylphenol containing 9 ethyleneoxide residues in the polyoxyethylene chain or a polyethylene-sorbitan monooleate. When it is desired to use a liquid formulation, the agent is customarily supplied to the ultimate user in the form of an emulsifiable concentrate. Wettable powder formulations may also be supplied. In addition, the compounds can be applied to the soil as solutions in volatile organic solvents such as kerosene, provided, of course, that plants are not already growing in the area. The compounds can also be dissolved in a suitable organic solvent and absorbed onto a solid carrier, which can then be distributed to the nematode-infested area using a spreader or like distribution means.

In general, after the nematocidal agent is applied to the surface of the soil, either in liquid or solid form, the soil is disked or plowed so as to distribute the nematocidal agent evenly in the upper layer of the soil, thus facilitating contact between the nematocidal agent and the nematodes.

Among the nematodes which can be controlled by the process of this invention are endoparasitic nematodes, including both root-knot nematodes such as *Meloidogyne hapla, Meloidogyne incognita, Meloidogyne javanica,* and root lesion nematodes such as *Pratylenchus vulnis, Pratylenchus zeae, Radopholus similis, Tylenchulus semipenetrans,* as well as ectoparasitic nematodes, including sting nematodes such as *Belonolaimus gracilis, Cacopaurus pestis,* and dagger nematodes such as *Xiphinema* species.

The compounds utilized in this invention are prepared by the method of Phillips, J. Chem. Soc., 1928, 2393. According to this procedure, a suitably substituted o-phenylenediamine and an organic acid are condensed in the presence of a strong acid, usually hydrochloric acid, to yield the desired product. Inasmuch as perfluoroacetic acid has an acid strength equivalent to that of a strong mineral acid, the synthesis of 2-trifluoromethylbenzimidazole and related 2-perfluoroalkylbenzimidazoles represented by the above formula can be accomplished without the addition of a mineral acid. A typical preparation follows:

EXAMPLE I 4-nitro-2,6-bis-(trifluoromethyl)benzimidazole

A solution of 40.5 g. of 2,6-dinitro-4-trifluoromethyl-1-chlorobenzene in 300 ml. of benzene was mixed with 250 ml. of 14 N ammonium hydroxide. The reaction mixture was stirred at room temperature for about 1.5 hours, at which point in time another 100 ml. of 14 N ammonium hydroxide were added and the stirring was continued for an additional 2 hours. The organic layer was separated, was washed with water and was dried. Removal of the solvents in vacuo yielded 2,6-dinitro-4-trifluoromethylaniline, which melted at about 142–144° C. after recrystallization from a hexanebenzene solvent mixture.

Twenty-four grams of 2,6-dinitro-4-trifluoromethylaniline were dissolved in 300 ml. of ethanol. The solution was heated to about 35° C. and 110 ml. of a 20 percent ammonium polysulfide solution containing 5 percent free sulfur was added. The temperature of the reaction mixture rose spontaneously to about 60° C., at which temperature it was maintained by heating for about 10 minutes. The reaction mixture was cooled to about 40° C. and poured into water. The resulting mixture was filtered. Acetone was added to the precipitate to remove the product from the sulfur. This mixture was filtered. Excess benzene was added to the filtrate which was then evaporated immediately to dryness in vacuo using the water-benzene azeotrope. Recrystallization of the resulting solid yielded purified 3-nitro-5-trifluoromethyl-o-phenylenediamine melting at about 121–123° C.

Three grams of 3-nitro-5-trifluoromethyl-o-phenylenediamine were reacted with 10 ml. of trifluoroacetic acid in 25 ml. of water by refluxing the mixture for about 4 hours. 4 - nitro-2,6 - bis-(trifluoromethyl)benzimidazole formed in the above reaction was isolated by pouring the reaction mixture into water. The product was dissolved in base at a pH of about 11 and some black insoluble by-product was filtered therefrom. The pH of the solution was lowered to about 7, at which point 4-nitro-2,6-bis-(trifluoromethyl)benzimidazole began to crystallize out of solution. The product was separated by filtration, the filter cake washed with water, and then dried. Recrystallization from a benzene-hexane solvent mixture yielded 4 - nitro - 2,6 - bis-(trifluoromethyl)benzimidazole, which melted at about 97–99° C. after recrystallization from a benzene-hexane solvent mixture.

*Analysis.*—Calc.: C, 36.13; H, 1.01; N, 14.05. Found: C, 36.24; H, 1.32; N, 13.87.

Certain other compounds represented by the above formula can be prepared by nitrating or chlorinating a 2,4- or 2,5-bis-(trifluoromethyl)benzimidazole or 2-trifluoromethyl - 4 (or 5) - methylbenzimidazole. The bis-(trifluoromethyl)benzimidazoles are prepared according to methods taught by Smith and Steinle, J. Am. Chem. Soc., 75, 1992 (1953), by Belcher, Sykes and Tatlow, J. Chem. Soc., 4159 (1954), by Fernandez-Bolanos et al., J. Chem. Soc., 4003 (1960), by Bishop et al., J. Chem. Soc. 3076 (1964), or are commercially available.

The following table lists the melting points and analyses of further compounds prepared according to the above procedures:

TABLE III

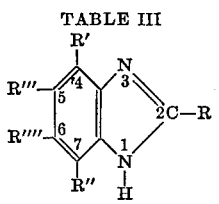

I claim:
1. A method of eliminating nematodes from a soil locus infested therewith, which method comprises contacting said nematodes with a 2-perfluoroalkylbenzimidazole of the following formula:

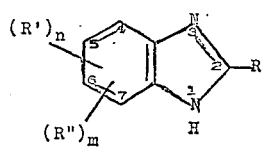

wherein R is a $C_1$–$C_3$ perfluoroalkyl group; R' is nitro or chloro; R'' is methyl or trifluoromethyl; $n$ is 0, 1 or 2; and $m$ is 1 or 2, such that when $m$ or $n$ is 2, R' and R'' can be the same or different members of the groups set forth above, applied at the rate of from about 2.5 to about 20 pounds per acre of said nematode-infested soil locus.

2. A process according to claim 1 in which the nematocidally active compound is 4-nitro-2,5-bis-(trifluoromethyl)benzimidazole.

3. A process according to claim 1 in which the nematocidally active compound is 2-trifluoromethyl-4-methylbenzimidazole.

4. A process according to claim 1 in which the nematocidally active compound is 5,6-dinitro-2-trifluoromethylbenzimidazole.

| R | R' | R'' | R''' | R'''' | MP./°C. | Analysis Calculated | Found |
|---|---|---|---|---|---|---|---|
| $CF_3$ | H | H | $CH_3$ | H | 170-1 | C, 54.00 H, 3.52 N, 14.00 | C, 54.20. H, 3.75. N, 13.47. |
| $C_2F_5$ | H | H | $CF_3$ | H | [1] 167-9 | C, 39.49 H, 1.32 N, 9.21 | C, 39.91. H, 1.61. N, 9.15. |
| $CF_3$ | $CH_3$ | H | H | H | 143-5 | C, 54.00 H, 3.52 N, 14.00 | C, 54.08. H, 4.04. N, 13.91. |

[1] Sub.

References Cited

UNITED STATES PATENTS

3,325,271   6/1967   Goldsmith et al. ___ 260—309.2

OTHER REFERENCES

Patent Journal (including trademarks and designs) May 4, 1966 p. 55 (So. African Patent 65/5584).

ALBERT T. MEYERS, *Primary Examiner.*

V. D. TURNER, *Assistant Examiner.*

U.S. Cl. X.R.
71—92